(12) United States Patent
Fox et al.

(10) Patent No.: US 6,941,740 B2
(45) Date of Patent: Sep. 13, 2005

(54) BALER GATE LINKAGE AND LATCH STRUCTURE

(75) Inventors: Jeffrey Robert Fox, Minburn, IA (US); Michael Lee Pearson, Ankeny, IA (US); Robert Matthew Bares, Johnston, IA (US)

(73) Assignee: Deere & Company, Moline, IL (US)

( * ) Notice: Subject to any disclaimer, the term of this patent is extended or adjusted under 35 U.S.C. 154(b) by 23 days.

(21) Appl. No.: 10/687,256

(22) Filed: Oct. 15, 2003

(65) Prior Publication Data

US 2005/0081502 A1 Apr. 21, 2005

(51) Int. Cl.[7] ............................................. A01F 39/00
(52) U.S. Cl. ........................................ 56/341; 100/88
(58) Field of Search ............................. 56/341; 100/88

(56) References Cited

U.S. PATENT DOCUMENTS

| | | | | |
|---|---|---|---|---|
| 4,389,930 A | * | 6/1983 | Rutschilling | 100/88 |
| 4,402,176 A | * | 9/1983 | Arnold et al. | 56/341 |
| 4,685,270 A | | 8/1987 | Brambilla | 53/176 |
| 4,703,605 A | | 11/1987 | Ackerman | 53/176 |
| 4,841,851 A | | 6/1989 | Quataert | 100/5 |
| 5,598,690 A | * | 2/1997 | McClure et al. | 56/341 |
| 5,802,805 A | | 9/1998 | Oiestad | 53/176 |
| 6,073,550 A | * | 6/2000 | Goossen et al. | 100/88 |
| 6,263,650 B1 | | 7/2001 | Deutsch et al. | 56/16.4 |
| 6,421,992 B1 | | 7/2002 | Goering et al. | 56/28 |
| 6,421,996 B1 | | 7/2002 | Deutsch et al. | 56/341 |
| 6,463,714 B2 | | 10/2002 | Viaud | 53/118 |
| 6,591,743 B2 | | 7/2003 | Deutsch et al. | 100/8 |

OTHER PUBLICATIONS 466 and 566 Round Balers Operator's Manual.

* cited by examiner

*Primary Examiner*—Meredith Petravick (57) ABSTRACT

A chassis-mounted round baler particularly useful with an on-board cotton module building system includes a bale release gate frame section connected to a forward frame section by a four bar linkage to define a gate path that allows the folding of the baler into both field transport and shipping configurations while maintaining desirable operating, transport and shipping heights. The gate linkage incorporates a self latching feature wherein a small vertical movement of the gate as the gate cylinders are operated releases a gate latch member from a forward frame member during gate opening and reengages the gate latch with the forward frame member during closing. The gate interacts with the bale handler to provide a stop for the baler gate when the baler gate is placed into a cradle on the handler.

18 Claims, 7 Drawing Sheets

BALER GATE LINKAGE AND LATCH STRUCTURE

FIELD OF THE INVENTION

The present invention relates generally to bale forming structures and, more specifically, to a baler of the type utilized with a cotton harvester to provide a cotton module directly on the harvester.

BACKGROUND OF THE INVENTION

Cotton harvesters having on-board module forming structure such as described in commonly assigned U.S. Pat. No. 6,421,996 provide a compact bale or module directly on the harvester to reduce the amount of support equipment needed in the field and minimize harvester idle time during offloading. The on-board processing structure includes a bale handling system for moving a large formed bale rearwardly to prepare the bale chamber for a second bale with little or no harvester down time. The formed bale is relatively large, and designing the bale-forming chamber to maintain a satisfactory harvester shipping and transport height has been a continuing source of difficulty. The system shown in the aforementioned U.S. Pat. No. 6,421,996 patent provides reduced height by pivoting one portion of the bale chamber relative to the other portion so that the uppermost extremity of the chamber is lowered. The aft chamber can be supported on a rear bale handler and lowered for increased height reduction. As the capacity of a harvester increases, the problems with maintaining shipping and road transport heights within acceptable ranges become more acute. In addition, servicing the bale chamber area or replenishing the wrap mechanism of the baler, particularly in a chassis-mounted baler, becomes more challenging because of the increased height of the unit above the ground.

With previously available baling systems having pivoting gate structure to release a formed bale, separate latching mechanisms are required to lock the gate in place. Such mechanisms, which may include cylinder operated locks or complicated linkages which have to be adjusted and which add to the cost and complexity of the baling system.

BRIEF SUMMARY OF THE INVENTION

It is therefore an object of the present invention to provide an improved on-board cotton handling system that overcomes most or all of the aforementioned problems. It is another object to provide such a system having an improved processor height reduction feature. It is a further object to provide an improved gate latch structure for a baler of the type utilized with an on-board processing system.

It is yet another object of the present invention to provide an improved baler structure particularly useful with an on-board cotton harvester module building system. It is a further object to provide such a structure having improved service accessibility and improved transport and shipping configurations.

A chassis-mounted round baler particularly useful with an on-board cotton module building system includes a bale release gate frame section connected to a forward frame section by a four bar or similar control linkage. The linkage generates a baler gate path that allows the folding of the baler into both field transport and shipping configurations while maintaining desirable operating, transport and shipping heights typical of many current cotton pickers. The linkage cooperates with a bale handler on the cotton picker which assists in the folding function and supports the gate in the transport and shipping configurations.

The gate linkage also incorporates a self latching feature the eliminates the weight, cost and complexity of a separate latching mechanism. The baler gate linkage permits a small vertical movement of the gate as the gate cylinders are operated. When the cylinders are first extended to raise the gate, an initial vertical movement lifts the gate slightly to release a gate latch member from a forward frame member. As the cylinders are retracted to move the gate closed, an opposite vertical motion at the end of the closing path reengages the gate latch from the forward frame member.

The four bar linkage also allows the gate center of gravity to be positioned such that the gate will stay in a fully opened position without positive pressure in the actuators that open the gate. The linkage and the ability to fold the baler into lower transport and shipping positions allows bale wrap to be put in the machine from the ground and makes service points on the baler easier to access. The gate interacts with the bale handler to provide a stop for the baler gate when the baler gate is placed into a cradle on the handler. The gate latches to the cradle and is moved to a reduced height transport or shipping position with downward movement of the handler. The gate cylinders can be operated in a float mode while the gate is latched to the handler.

DESCRIPTION OF THE PREFERRED EMBODIMENT

Figure 1:
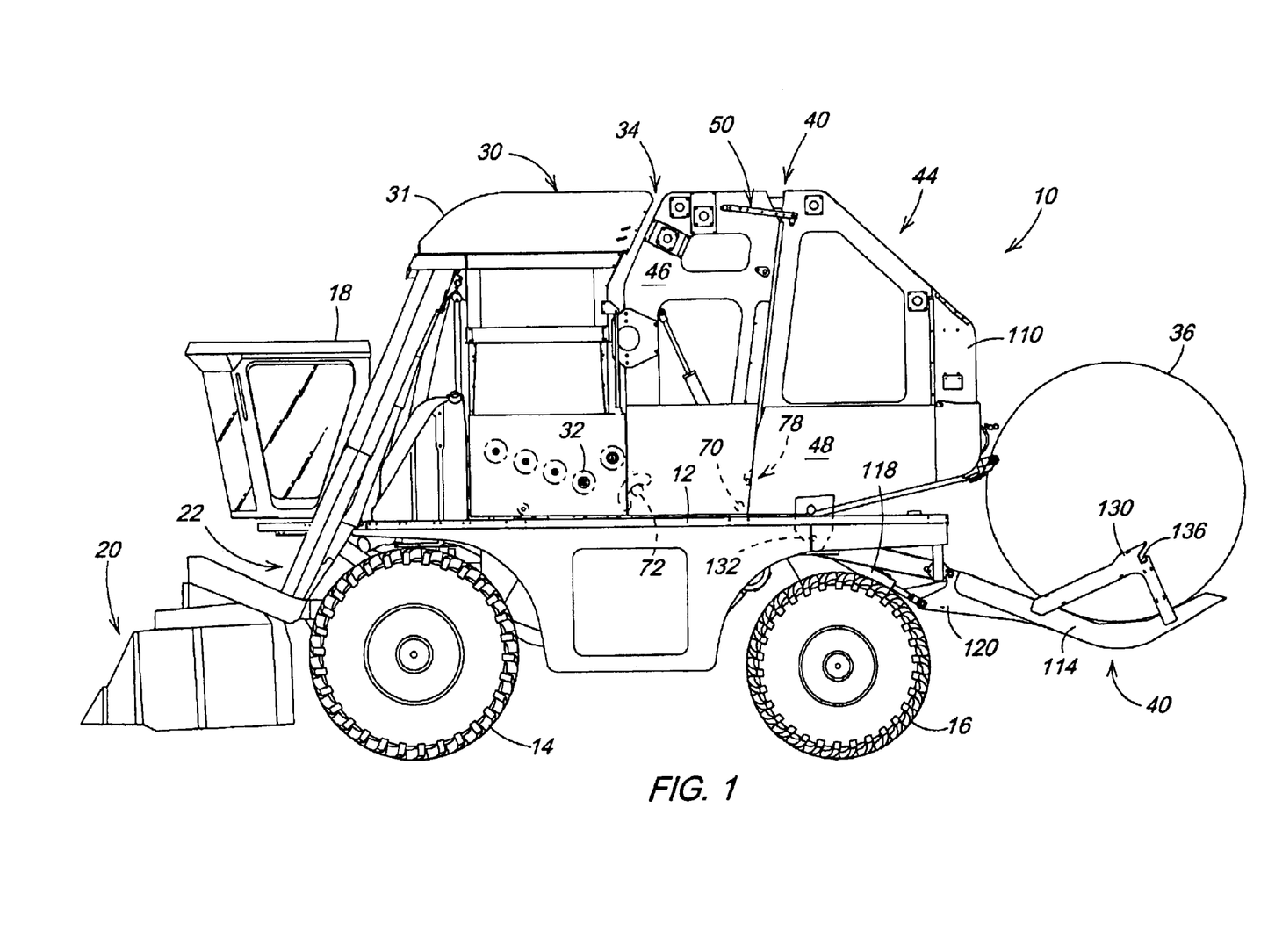
FIG. 1 is a side view of a cotton harvester with an on-board module builder and bale handler system.

Referring to FIG. 1 therein is shown a cotton harvester 10 having a main frame 12 supported for movement by forward drive wheels 14 and rear steerable wheels 16. A cab 18 is supported at the front end of the main frame 12 above forwardly mounted harvesting structure indicated at 20 which removes cotton from plants and directs the removed cotton into an air duct system 22.

An upright telescoping accumulator system 30 with an upper inlet structure 31 and a metering floor 32 is supported on the frame 12 behind the cab 18 for receiving the cotton from the air duct system 22. A processor or module builder 34 is supported rearwardly of the accumulator system 30. The accumulator system 30 stores cotton as necessary, and the metering floor 32 distributes the cotton to the module builder 34 which first forms a mat of material and then rolls the mat into a compact bale or module 36. The accumulator and processor system with the exception of the linkage and locking structure described in detail below may be generally of the type shown and described in the commonly assigned U.S. Pat. No. 6,421,996 entitled Harvester with Bale Forming Chamber Having a Transport Mode.

A bale or module handling system 40 is located rearwardly of the processor 34 for receiving a bale or module from the processor 34. The handling system 40 temporarily supports the module 36 (FIG. 1) for transport during field-working operations and then discharges it from the harvester 10 at the desired location in the field. The module builder 34 includes baler 40 having a clamshell type of housing 44 including first and second (front and rear) upright or frame sections 46 and 48. The sections 46 and 48 are connected together by a control linkage structure 50. In a field-working position (FIG. 1), the top portions of the sections 46 and 48 are located at or slightly above the level of the top of the accumulator system 30 to establish a maximum working height of the harvester 10. Cylinders (not shown) on each side of the accumulator structure 30 lower the top of the system 30 for transport and shipping.

The module builder 34 includes a bale-forming chamber with a round baler belt and roller structure which receives material from the accumulator system 30 when the builder 34 is in the upright field-working position shown in FIG. 1. The baler structure 60 operates in a manner generally identical to that of a conventional round baler and rolls the material into a compact round bale. It is to be understood that various types of delivery systems for conveying the material to the baling device may be utilized with the present invention.

When a complete bale is formed, the rear or gate section 48 of the clamshell housing 44 is rocked rearwardly and upwardly to release the bale from the chamber onto the handling system 40 (FIG. 1). The accumulator system 30 facilitates continued operation of the harvester 10 while the bale 36 is released from the chamber. The handling system 40 is positioned to receive, support and transport the completed bale while the harvesting continues. When the desired location such as the end of the field is reached, the system 40 is activated to lower the bale 36 and release it from the harvester 10.

Figure 3:
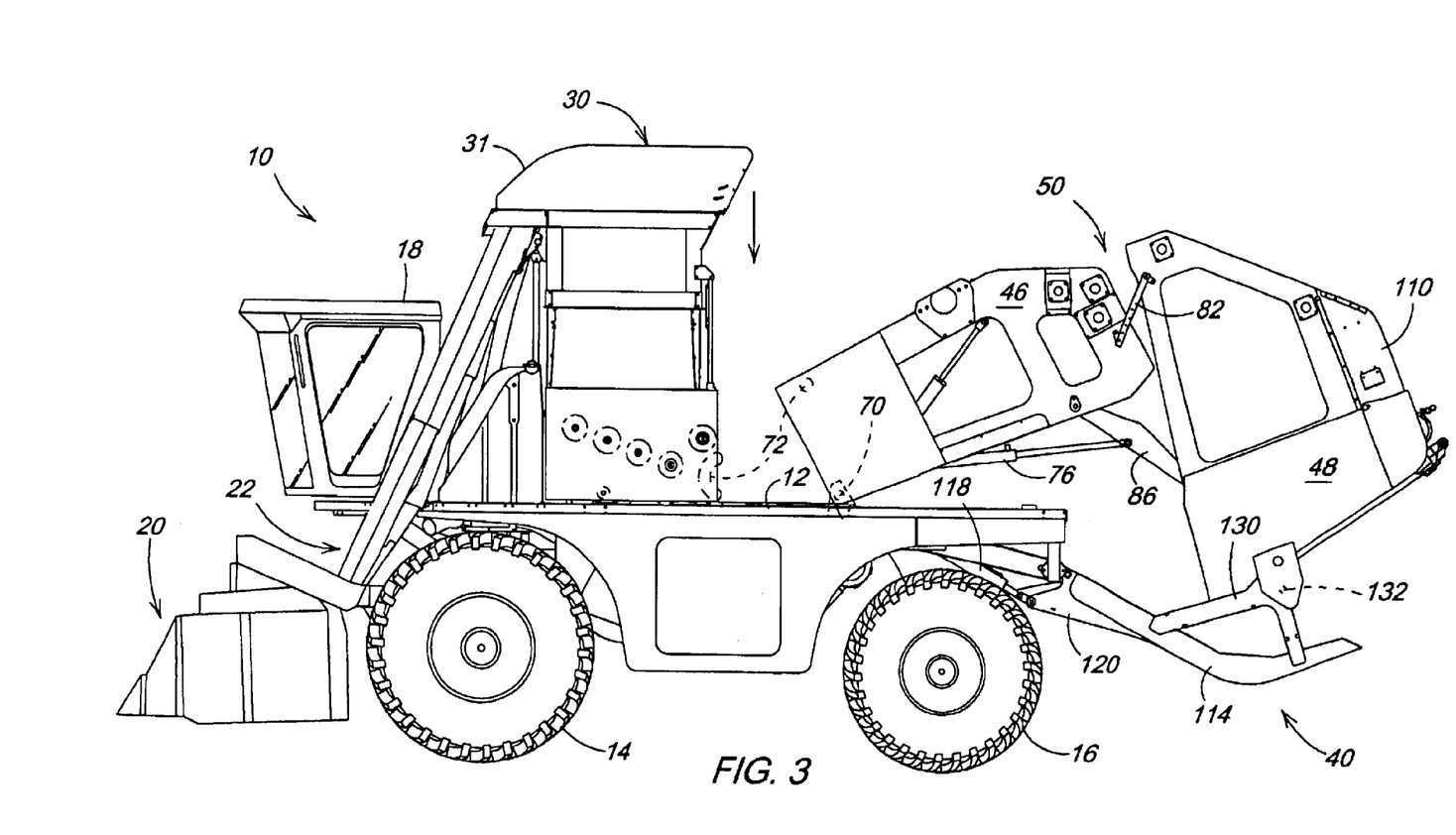
FIG. 3 is another view similar to FIG. 1 but showing the module builder supported in a lowered transport position by the bale handler.
Figure 4:
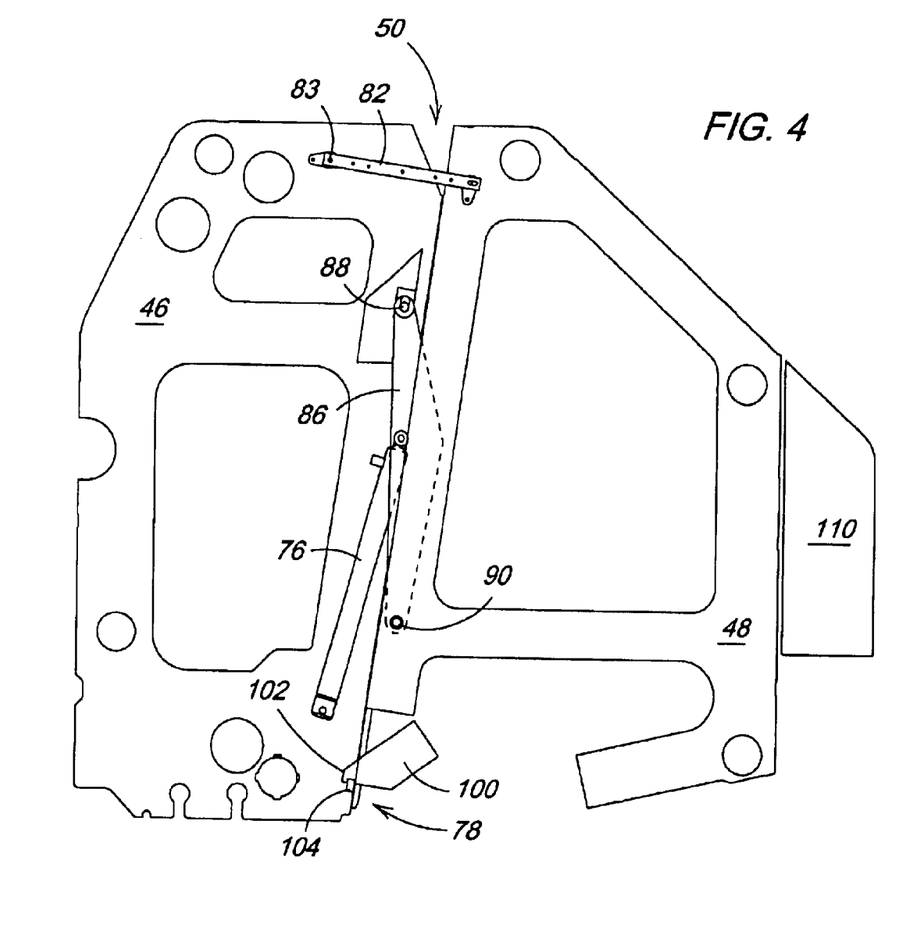
FIG. 4 is a side view of the module frame sections in the closed and locked position with cylinder structure fully retracted.
Figure 5:
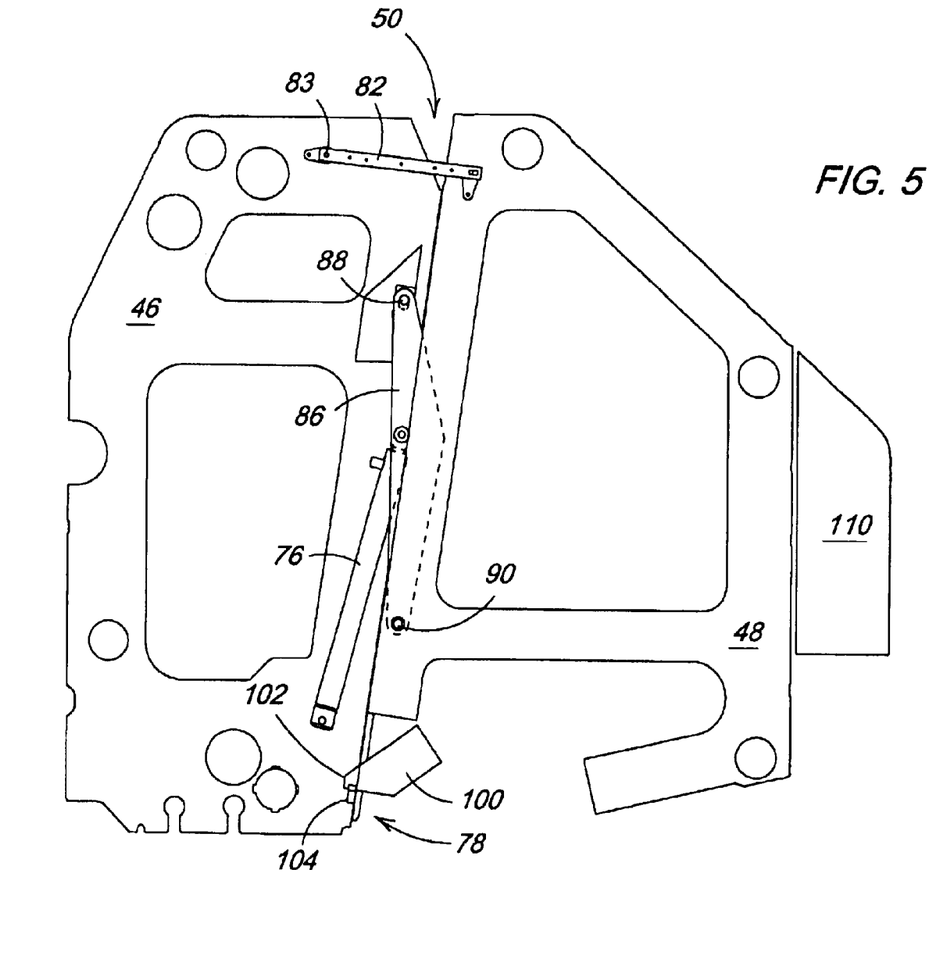
FIG. 5 is a view similar to FIG. 4 but showing the frame sections in an unlocked position upon initial extension of the cylinder structure.

The front frame section 46 is pivotally connected to the harvester frame 12 by a pivot 70 for rocking between an upright field-working position (FIG. 1), a rearwardly and downwardly directed transport position (FIG. 3), and a shipping position wherein the bale handler is at ground level. Hydraulically operated latch or securing structure 72 is mounted on the frame 12 and the lower forward portion of the front frame section 46 to lock the front frame section in an upright field-working position. Cylinder structure 76 located on each side of the baler includes a first end connected to the frame section 46 and a second end connected to a central location on the linkage structure 50. With the front frame section 46 latched in the upright position and the cylinder structure 76 fully retracted (FIG. 1), the sections 46 and 48 abut to define the bale forming chamber extending upwardly from the harvester frame 12. The top of the chamber is approximately level with the top of the extended accumulator system 30. Automatically operable gate lock structure 78 supported by the frame sections 46 and 48 rearwardly adjacent the front frame pivot 70 latches the sections together (FIG. 4) as the bale forming chamber is closed during retraction of the cylinder structure 76. Upon initial activation of the cylinder structure 76 to open the chamber (FIG. 5), there is initial relative vertical motion of the sections 46 and 48 to release the gate lock structure 78 without need for a complicated latch linkage or hydraulic latch actuating cylinders.

Figure 2:
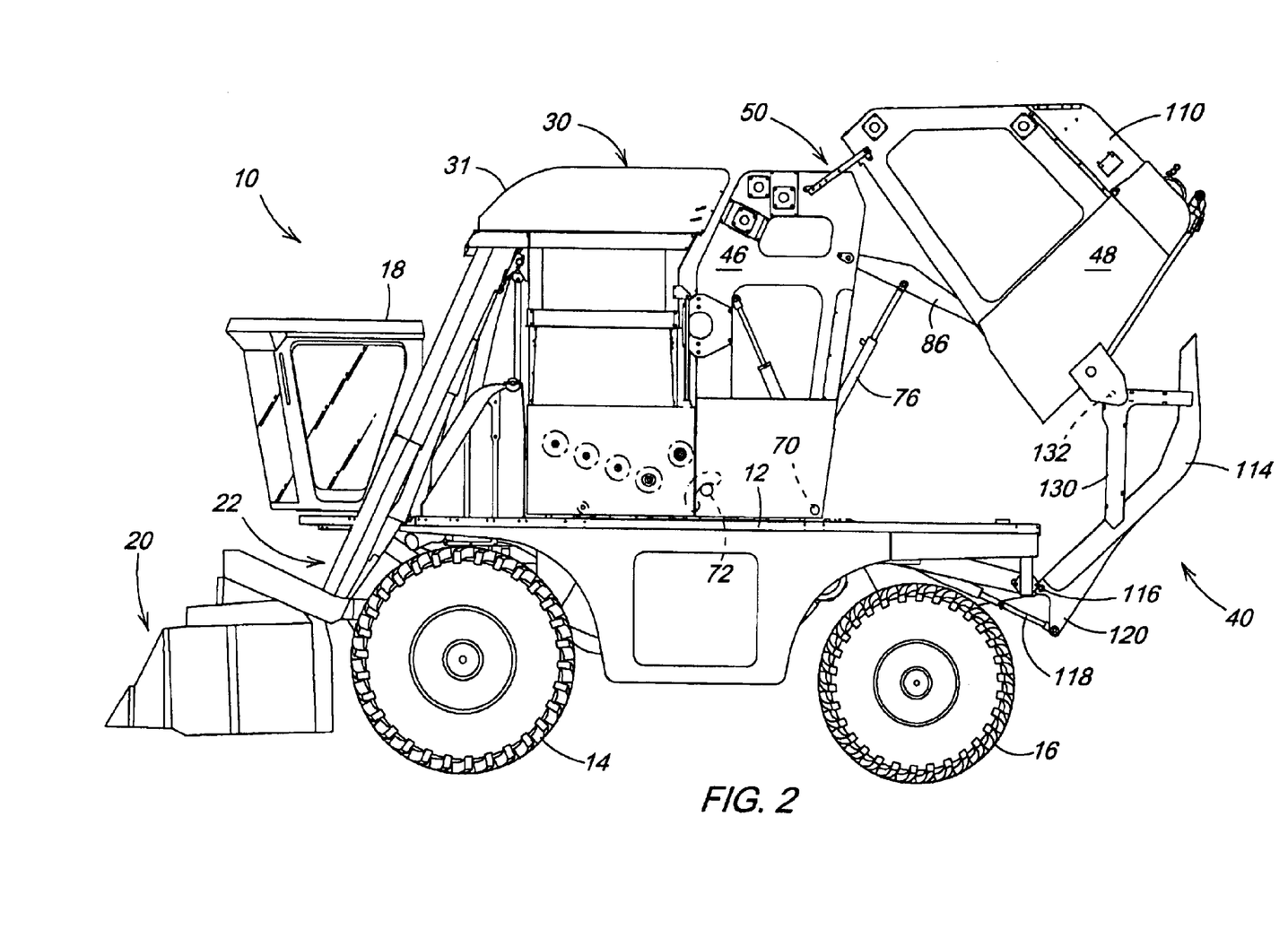
FIG. 2 is a view similar to FIG. 1 but showing the module builder supported by the bale handler.

To open the bale forming chamber, the cylinder structure 76 is extended to initially release the gate lock structure 78 and then to rock the section 48 upwardly relative to the section 46 to open the housing and release the formed bale 36. The released bale 36 can then be carried by the harvester 10 (FIG. 1) to a convenient deposit area in the field while the harvesting operation continues uninterrupted. To move the housing 44 to the transport or the shipping position, the section 48 is rocked upwardly and the bale handling system 40 moved to the upright position. The cylinder structure 76 is retracted to rock the section downwardly towards the closed position. However, the upright handling system 40 is in the path of travel of the section 48 and latches to the section 48 (FIG. 2). Thereafter, the cylinder structure 76 is put into a float condition. The latching structure 72 is operated to release the front frame section 46, and the handling system 40 is then moved downwardly. The sections 46 and 48 move downwardly primarily under the influence of gravity with the system 40. Since the section 48 is positively latched to the handing system 40, the system 40 can exert a pull on the sections if necessary.

Figure 6:
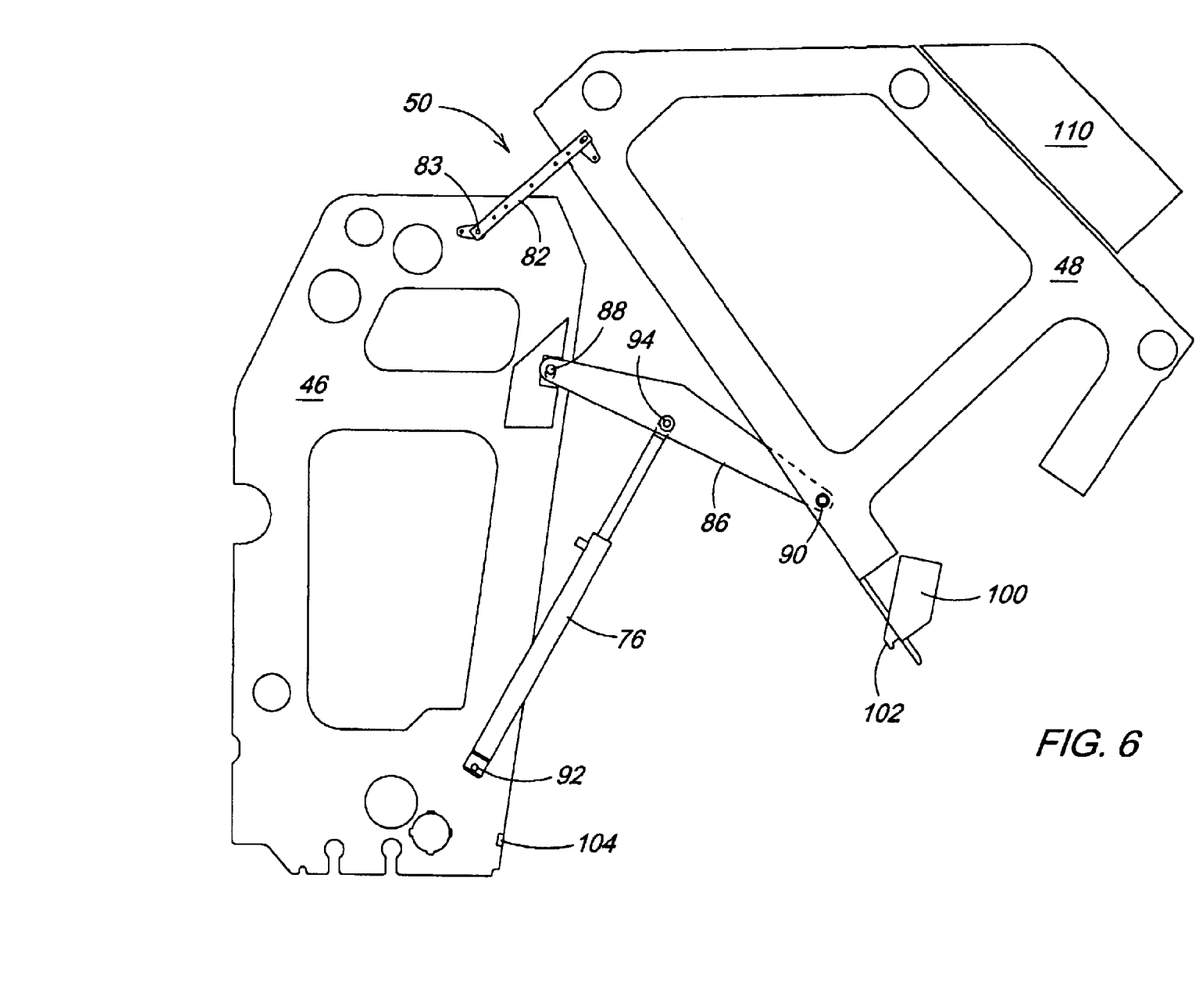
FIG. 6 is a view similar to FIG. 4 but showing the frame sections with the cylinder structure partially extended.

The linkage structure 50 is preferably a four bar linkage structure or similar linkage structure providing more control of the orientation of the sections 46 and 48 as they are rocked relative to each other than a simple pivot structure alone can afford. As shown, the linkage structure 50 rocks the upper portion of the rear frame section 48 over the top of the forward frame section 46 (FIGS. 6 & 7) as the chamber approaches a maximum open position. Therefore, the front frame section 46 is pivoted to a lower position for transport (FIG. 3) or shipping.

The structure 50 includes upper links 82 on opposite sides of the chamber, each having a forward end pivotally connected at 83 to a top central portion of the section 46 and an aft end pivotally connected to a top forward portion of the section 48. Lower reinforced links 86 substantially longer than the links 82 each include a first end pivotally connected to a vertically sliding pivot 88 located below and rearwardly of the pivot location 83 on the section 46 and a second end pivotally connected at a lower forward location on the rear frame section 48. The sliding pivot 88 permits limited vertical movement when the cylinder structure 76 is operated near the fully retracted position.

The cylinder structure 76 includes two hydraulic cylinders on opposite sides of the chamber, each with a base end pivotally connected at a location 92 near the bottom aft portion of the section 46. The rod end of the cylinder 94 is connected at a central location on the corresponding lower link 86. The cylinder structure 76 is connected to a conventional hydraulic control (not shown) located on the harvester 10 for extending and retracting the cylinders and for establishing cylinder locked and cylinder float conditions.

The automatically operable gate lock structure 78 includes a latch plate 100 fixed to the lower forward end of the frame section 48. The plate 100 has a forwardly projecting hook 102. A latch-receiving member 104 is secured to the bottom aft portion of the frame section 46 in alignment with the plate 100. As the frame section 48 is rocked downwardly towards the closed position, the cylinder structure 76 maintains the sliding pivot in the upwardmost position (FIG. 5) until the hook 102 clears the latch-receiving member 104. Thereafter, continued retraction of the cylinder structure 76 allows the frame 48 to lower and lock the hook 102 over the member 104. The weight of the frame section 48 maintains the lock structure in the latched position until the operator extends the cylinder structure 76. Upon initial extension of the cylinders, the sliding pivot 88 facilitates upward motion of the frame section 48 relative to the frame section 46 until the hook 102 is released from the member 104. It is to be understood that the hook 102 and member 104 can be reversed. Also, the securing structure 72 may be any type of simple latch arrangement that relies on relative movement between the sections for engagement and release.

Figure 7:
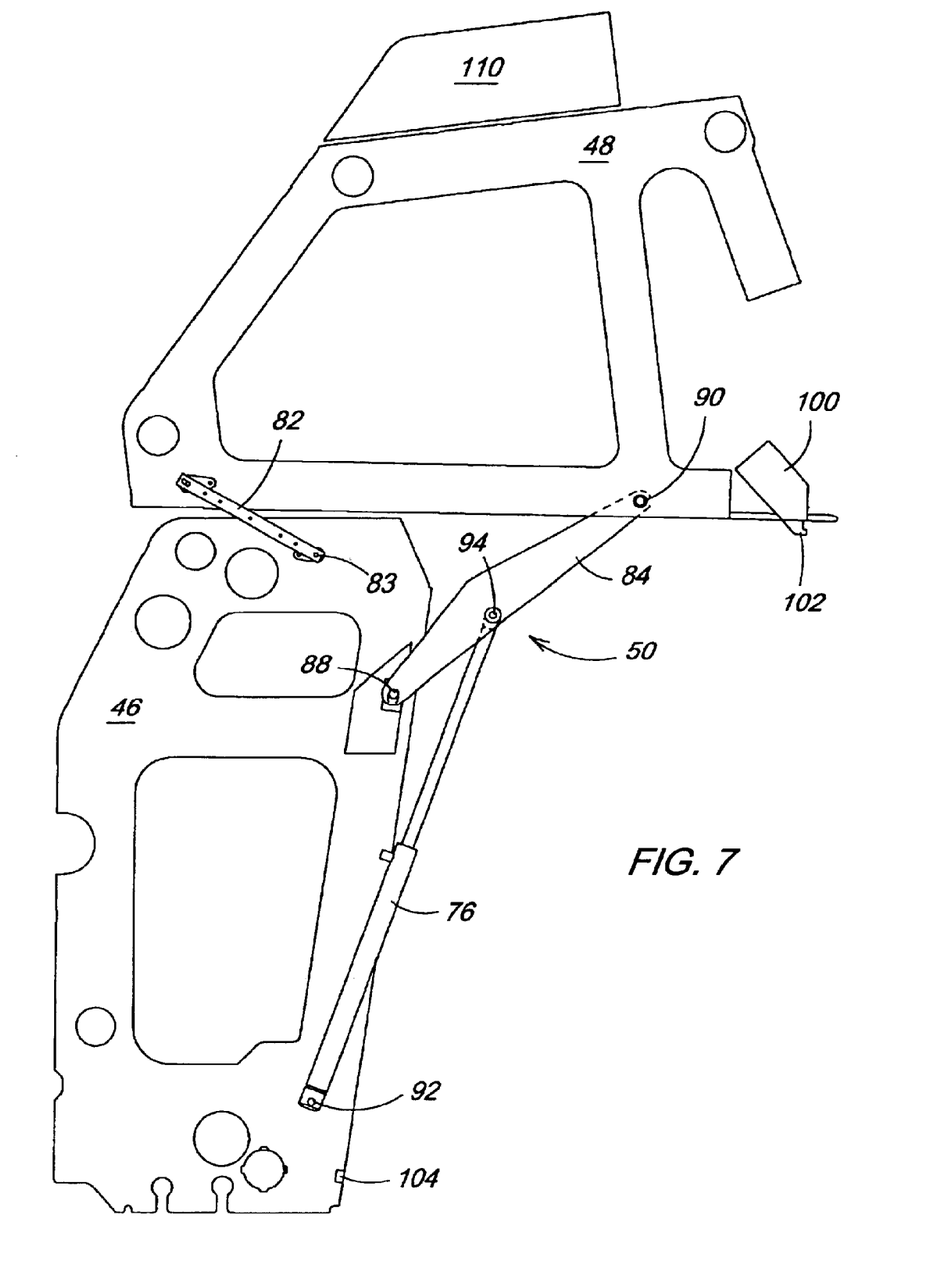
FIG. 7 is a view similar to FIG. 6 but showing the relative positions of the frame sections with the cylinder structure fully extended.

Continued extension of the cylinder structure 76 after automatic latch release causes the frame section 48 to rock rearwardly and upwardly (FIGS. 6 & 7) towards an open position under the control of the linkage structure 50. Further extension of the cylinder structure 76 provides a relative motion between the sections that moves the upper forward portion of the rear frame section 48 over the top portion of the frame section 46 for transport (FIG. 3) and for shipping or maintenance of structure on the rear frame section 46 (FIG. 7). The rear frame section 48 supports a bale wrap system 110 which can be lowered as described in detail below for easy access for maintenance or bale wrap reloading.

The bale handling system 40 includes an upwardly concave bale support structure 114 having a forward end pivotally connected to the aft end of the frame 12 for rocking about a horizontal pivot. Lift cylinder structure 118 is connected between the frame 12 and a lower forward projection 120 on the support structure 114. When a completed bale is formed in the chamber, the frame section 48 is rocked towards an open gate position (FIGS. 6 & 7) to release the bale for support by the structure 114 (FIG. 1). The accumulator system 30 permits continued operation of the harvester 10 while the bale 36 is released. When the bale release position is reached in the field, the cylinder structure 118 is retracted to lower the support structure 114 and allow the bale to roll unto the ground.

On each side of the bale handling system 40, latch structure 130 extends upwardly from the support structure 114 to receive a corresponding tubular member 132 supported from an aft lower portion of the rear frame section 48 when the section 48 is rocked downwardly from the open position (FIG. 2) with the bale handling system 40 in the raised position. The latch structure 132 includes an opening 136 (FIG. 1) which lies in the path of the member 132 and captures the member as the cylinder structure 76 is retracted. Once the members 132 are captured by the latch structure 130, the hydraulically operated latch 72 can be operated to release the front frame section 46 for rocking rearwardly about the pivot 72. The cylinder structure 76 is placed in the float mode, and the handling system 40 controls the lowering and raising of the frame sections 46 and 48 between the transport or shipping positions and the capture position of FIG. 2. The accumulator system 30 can also be retracted (see arrow in FIG. 3) generally to the level of the top of the lowered sections 46 and 48 for compact transporting or shipping.

Having described the preferred embodiment, it will become apparent that various modifications can be made without departing from the scope of the invention as defined in the accompanying claims.

What is claimed is:

1. A baler having a bale forming chamber with first and second upright frame sections, the second frame section movable relative to the first frame section for releasing a formed bale from the chamber, linkage structure connecting the first and second frame sections including a control linkage having an upper link connecting an upper portion of the first frame section with an upper portion of the second frame section, a second link pivotally connected between first and second frame sections at a location below the upper link, and cylinder structure connected between the frame sections and rocking the second frame section relative to the first frame section between a closed position for forming a bale and an open position for releasing the bale, wherein in the closed position, the upper portions of the frame sections generally abut, wherein the upper link moves the second frame section over the upper portion of the first frame section as the cylinder rocks the second frame member towards the open position; and further including a latch member connected to the second frame section and securing the second frame section to the first frame section in the closed position, wherein the operation of the cylinder structure with the frame sections in the closed position initially moves the first frame section to release the latch member without need for a separate unlatching mechanism.

2. The baler as set forth in claim 1 wherein operation of the cylinder structure moving the frame sections to the closed position secures the latch member without need for a separate latching mechanism.

3. The baler as set forth in claim 1 wherein control linkage includes pivot structure facilitating limited vertical movement of the second frame section relative the first frame section as the cylinder structure is operated.

4. A baler having a bale forming chamber with first and second upright frame sections, the second frame section movable relative to the first frame section for releasing a formed bale from the chamber, linkage structure connecting the first and second frame sections including a control linkage having an upper link connecting an upper portion of the first frame section with an upper portion of the second frame section, a second link pivotally connected between first and second frame sections at a location below the upper link, and cylinder structure connected between the frame sections and rocking the second frame section relative to the first frame section between a closed position for forming a bale and an open position for releasing the bale, wherein in the closed position, the upper portions of the frame sections generally abut, and wherein the upper link moves the second frame section over the upper portion of the first frame section as the cylinder rocks the second frame member towards the open position; and wherein, in the closed position, the upper link is generally horizontal and the second link is upright.

5. The baler as set forth in claim 4 wherein the upper link has an effective length less than that of the lower link.

6. A baler having a bale forming chamber with first and second upright frame sections, the second frame section movable relative to the first frame section for releasing a formed bale from the chamber, linkage structure connecting the first and second frame sections including a control linkage having an upper link connecting an upper portion of the first frame section with an upper portion of the second frame section, a second link pivotally connected between first and second frame sections at a location below the upper link, and cylinder structure connected between the frame sections and rocking the second frame section relative to the first frame section between a closed position for forming a bale and an open position for releasing the bale, wherein in the closed position, the upper portions of the frame sections generally abut, wherein the upper link moves the second frame section over the upper portion of the first frame section as the cylinder rocks the second frame member towards the open position; and including a harvester frame, and wherein the first frame section is pivotally connected to the harvester frame for rocking between an upright operating position and a lowered transport position.

7. The baler as set forth in claim 6 including a bale handler located adjacent the second frame section and wherein the second frame section and the bale handler include engaging structure for supporting the second frame section from the bale handler.

8. A baler having a bale forming chamber with first and second upright frame sections, the second frame section movable relative to the first frame section for releasing a formed bale from the chamber, linkage structure connecting the first and second frame sections including a control linkage having an upper link connecting an upper portion of the first frame section with an upper portion of the second frame section, a second link pivotally connected between first and second frame sections at a location below the upper link, and cylinder structure connected between the frame sections and rocking the second frame section relative to the first frame section between a closed position for forming a bale and an open position for releasing the bale, wherein in the closed position, the upper portions of the frame sections generally abut, wherein the upper link moves the second frame section over the upper portion of the first frame section as the cylinder rocks the second frame member towards the open position; and wherein the cylinder structure is connected to a central portion of the second link.

9. A baler as set forth in claim 8 wherein the cylinder structure includes a cylinder having a distal end connected to the central portion and a proximate end pivotally connected to the first frame section.

10. A baler having a bale forming chamber with first and second upright frame sections, the second frame section movable relative to the first frame section for releasing a formed bale from the chamber, linkage structure connecting the first and second frame sections including an upper portion of the first frame section with an upper portion of the second frame section, and cylinder structure connected between the frame sections for rocking the second frame section relative to the first frame section between a closed position for forming a bale and an open position for releasing the bale, wherein in the closed position the frame sections generally abut, a latch member connected to the second frame section and securing the second frame section to the first frame section in the closed position, wherein the operation of the cylinder structure with the frame sections in the closed position initially moves the first frame section to release the latch member without need for a separate unlatching mechanism; and wherein the latch member comprises a hook, the hook movable with operation of the cylinder structure into and out of engagement with the first frame section.

11. A baler having a bale forming chamber with first and second upright frame sections, the second frame section movable relative to the first frame section for releasing a formed bale from the chamber, linkage structure connecting the first and second frame sections including an upper portion of the first frame section with an upper portion of the second frame section, and cylinder structure connected between the frame sections for rocking the second frame section relative to the first frame section between a closed position for forming a bale and an open position for releasing the bale, wherein in the closed position the frame sections generally abut, a latch member connected to the second frame section and securing the second frame section to the first frame section in the closed position, wherein the operation of the cylinder structure with the frame sections in the closed position initially moves the first frame section to release the latch member without need for a separate unlatching mechanism; and wherein the linkage structure includes a vertically movable pivot responsive to operation of the cylinder structure for facilitating movement of the second frame section vertically relative to the first frame section to release the latch member and facilitate rocking motion of the second frame section relative to the first frame section.

12. A baler for a framed cotton harvester for making cotton modules on board the harvester, the baler including a bale forming chamber with first and second frame sections, the second frame section movable relative to the first frame section for releasing a formed bale from the chamber, linkage structure connecting the first and second frame sections including upper and lower links connecting an upper portion of the first frame section with an upper portion of the second frame section, and cylinder structure connected to the frame sections for rocking the second frame section relative to the first frame section between a closed position for forming a bale and an open position for releasing the bale and for moving the sections to a lowered transport position, wherein the upper and lower links move the second frame section over the upper portion of the first frame section as the cylinder structure rocks the second frame member towards the open position.

13. The baler as set forth in claim 12 further including a bale handler movably supported from the harvester frame adjacent the chamber and receiving the released bale, the bale handler movable from an upright position to a lowered bale release position and including a frame section support member, the second frame section including a mating member for receipt by the frame section support member when the bale handler is in the upright position, and motor structure connected to the bale handler for moving the handler between the upright and lowered positions.

14. The baler as set forth in claim 13 wherein the motor structure moves the first and second frame sections toward a transport position after the frame section support member has received the mating member, the cylinder structure including a hydraulic cylinder connected to the bale chamber and having a float mode, the cylinder being in the float mode as the frame sections are moved by the motor structure.

15. The baler as set forth in claim 14 wherein the first frame member is pivotally connected to the frame and the first frame member is pivoted downwardly as the motor structure moves the frame sections towards the transport position.

16. The baler as set forth in claim 12 wherein the second frame section is movable along a path which intersects with the bale handler to provide a stop for the second frame section, wherein the second frame section defines a baler gate and the bale handler defines a cradle, and the baler gate is placed into the cradle for support in a transport position, and wherein the second frame section is offset over the upper portion of the first frame section to reduce transport height in the transport position.

17. The baler as set forth in claim 12 including a latch member connected to the second frame section and securing the second frame section to the first frame section in the closed position, wherein the operation of the cylinder structure with the frame sections in the closed position initially moves the first frame section to release the latch member without need for a separate unlatching mechanism.

18. The baler as set forth in claim 13 including reloadable bale wrap mechanism supported on the second frame section, wherein the motor structure moves the second frame section to a lowered position to facilitate reloading of the wrap mechanism.

* * * * *